United States Patent [19]

Smith

[11] 3,963,816
[45] June 15, 1976

[54] PROCESS FOR MOLDING EXPANDABLE THERMOPLASTIC MATERIAL

[75] Inventor: Stuart B. Smith, Leominster, Mass.

[73] Assignee: Foster Grant Co., Inc., Leominster, Mass.

[22] Filed: Sept. 2, 1971

[21] Appl. No.: 177,476

[52] U.S. Cl. .............................. 264/53; 264/DIG. 9
[51] Int. Cl.$^2$ ......................................... B29D 27/00
[58] Field of Search ................... 264/51, 53, DIG. 9, 264/DIG. 10, 45

[56] References Cited
UNITED STATES PATENTS

| | | | |
|---|---|---|---|
| 3,086,248 | 4/1963 | Culp | 264/53 |
| 3,126,432 | 3/1964 | Schuur | 264/DIG. 15 |
| 3,155,379 | 11/1964 | Fischer et al. | 264/DIG. 9 |
| 3,162,704 | 12/1964 | Attanasio et al. | 264/DIG. 10 |
| 3,207,820 | 9/1965 | Scarvelis et al. | 264/DIG. 9 |
| 3,417,170 | 12/1968 | Knapp | 264/51 |
| 3,446,882 | 5/1969 | Landon | 264/45 |
| 3,452,124 | 6/1969 | Knapp | 264/53 |

OTHER PUBLICATIONS

"Glass Glossary" The American Ceramic Society, Columbus, Ohio (Reprinted from *The American Ceramic Society Bulletin*, 27 [9] 353–362 (1948), pp. 6, 7.
Fox, Thomas G. and Paul J. Flory. "Second–Order Transition Temperatures and Related Properties of polystyrene, I. Influence of Molecular Weight," in the *Journal of Applied Physics*, vol. 21, June, 1950, pp. 581–591.
Boundy, Ray H. and Raymond P. Boyer, Editors, "Styrene its Polymers, Copolymers and Derivatives," New York, Reinhold, 1952, pp. 574–578, 589–591, 596–600, 604–606.
Muus, Laurits T.; N. Gerard McCrum, and Frank C. McGraw, "On the Relationship of Physical Properties to Structure in Linear Polymers of Ethylene and Propylene," In *SPE Journal*, May, 1959, pp. 368–372.
"SPI Plastics Engineering Handbook," Third Edition, New York, Reinhold, c 1960, pp. XXXIX; XLI; XLVI; XLVII.
Boyer, R. F. "Introductory Remarks for Symposium on Transitions and Relaxations in Polymers," In *Journal of Polymer Sciences*, Part C No. 14, pp. 3–14 (1966). (Bound in Transitions and Relaxations in Polymers, J. Polym. Sci. Part C, Polymer Symposia, No. 14).
Whittington, Lloyd R., "Whittington's Dictionary of Plastics," Stamford, Conn., Technomic, c 1968, pp. 113, 149, 150.
*Encyclopedia of Polymer Science and Technology*, vol. 3, Sections "Characterization of Polymers," New York, Interscience, c 1965, pp. 619–621.
Whittington, Lloyd R. "Whittington's Dictionary of Plastics", Stamford, Conn., Technomic, c 1968, pp. 18, 179, 221, 251.

*Primary Examiner*—Philip Anderson
*Attorney, Agent, or Firm*—Leonard S. Selman

[57] ABSTRACT

Molded articles are made from expandable thermoplastic resin material by pre-expanding the thermoplastic material in particulate or bead form containing as the principal expanding agent a liquid hydrocarbon by contact with steam until the desired degree of expansion is obtained, heating the beads in a stream of substantially dry, hot gas at a temperature above the boiling point of the hydrocarbon but below the fusion temperatures of the thermoplastic material while agitating the beads to prevent agglomeration upon softening until substantially all of the moisture is removed from the surfaces of the pre-expanded beads, and molding the article from the heated pre-expanded beads by placing them in a closed mold and heating them to a temperature above their fusion temperature, the temperature of the thermoplastic material being continuously maintained above the boiling point of the expanding agent from the time the beads are pre-expanded until they are molded into the shaped article.

11 Claims, 1 Drawing Figure

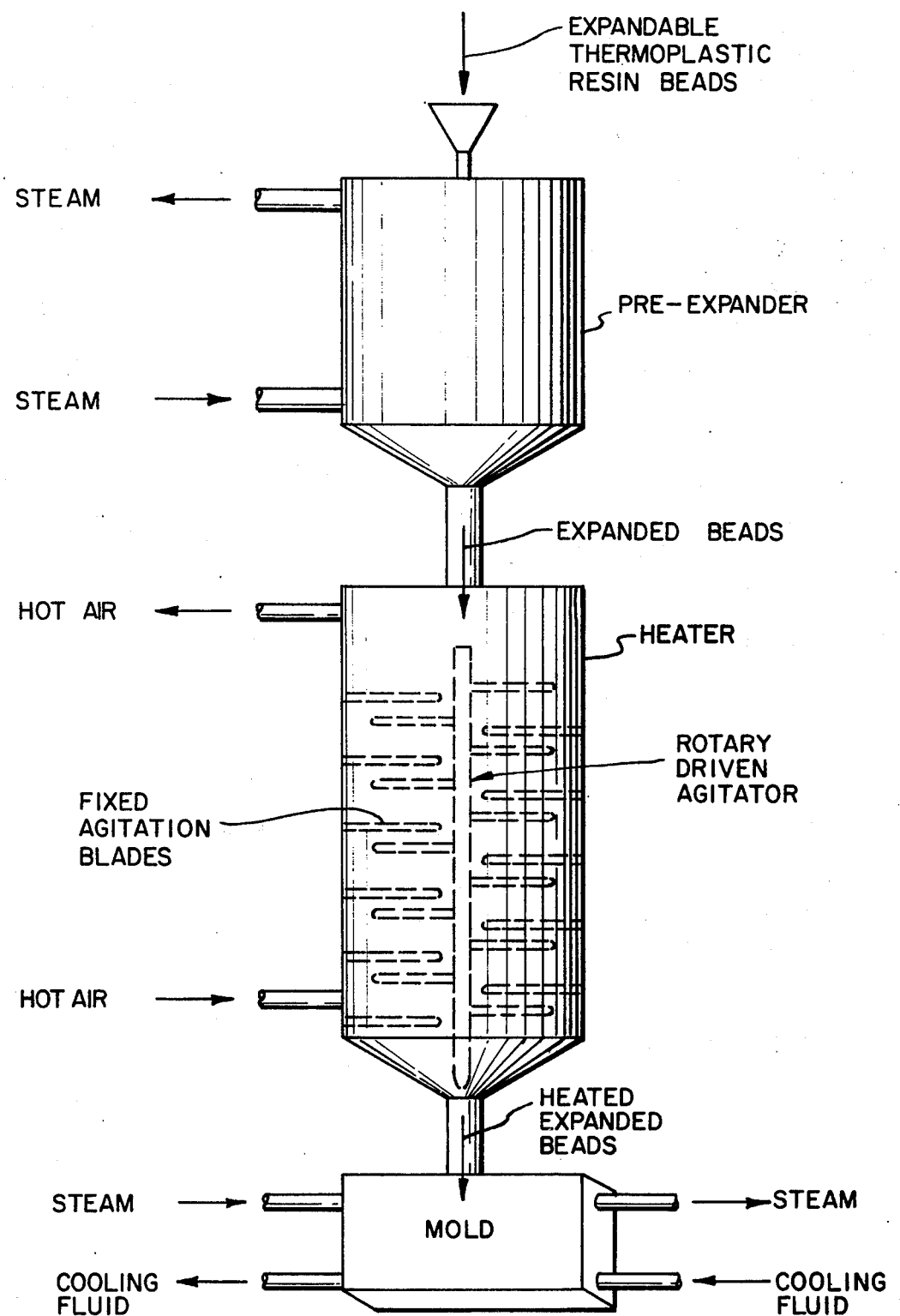

PROCESS FOR MOLDING EXPANDABLE THERMOPLASTIC MATERIAL

BACKGROUND OF THE INVENTION

This invention relates to preparation of expanded thermoplastic articles and more particularly to a rapid-cycle and energy and time conserving process for preparing low-density molded thermoplastic articles.

In one of the most common methods of producing molded articles from expanded thermoplastic materials, thermoplastic particles such as beads or pellets containing a liquid expanding agent are heated to a temperature above the boiling point of the expanding agent and the softening temperature of the thermoplastic material. The thermoplastic material expands under the pressure exerted by the expanding agent. After the desired degree of pre-expansion is obtained the thermoplastic particles are removed from the pre-expander and permitted to cool whereby they re-assume their rigid nature but are enlarged about 20 – 40 times their original size. As the temperature of the particles drops the residual expanding agent in the particles condenses, thereby forming a partial vacuum in the hollow cells of the particles. If these particles are placed into a mold and expanded with permitting the pressure within and without the cells to reach equilibrium by gas diffusion, the expandable particles or beads will collapse upon being reheated to the softening temperature of the thermoplastic material. To avoid this it is common practice to permit the beads to age for a period of about 1 – 24 hours during which time the pressure inside the beads reaches atmospheric pressure. The beads can then be heated without danger of collapse. The term softening temperature as used above refers to the temperature at which the thermoplastic material will begin to change from a rigid to a soft state.

In manufacturing molded articles a predetermined amount of aged beads or pellets are placed in a mold and directly heated in the mold by heating up the mold. Since the thermoplastic material is an excellent heat insulator a great deal of heat must be put into the mold to insure that all of the particles reach the fusion temperature at approximately the same time, which is necessary to produce molded products having a uniform density. After the beads or pellets are fused together, the molded article must be cooled again. A large amount of cooling medium must be passed through and around the mold to cool the molded article to a temperature at which it is rigid before it can be removed from the mold. This obviously requires a relatively long molding cycle.

A recent patent, U.S. Pat. No. 3,417,170, issued to Knapp on Dec. 17, 1968 discloses a method of reducing the cycle time in a molding process for preparing expanded thermoplastic articles. In the process disclosed in this patent pre-expanded beads are pre-heated to a temperature above the boiling point of the expanding agent but slightly below the fusion temperature of the thermoplastic material prior to being introduced into a closed mold. When the heated beads are placed in the mold it is only necessary to heat them slightly to raise them above their fusion temperature. Therefore, it is not necessary to introduce great amounts of heating medium into the mold, hence the molding cycle time is greatly reduced.

Molding processes are known in which expandable thermoplastic particles are heated by means of a hot noncondensable dry gas such as heated air and then introduced directly into the mold thereby eliminating the aging and reheating steps. These processes have generally limited applications such as the molding of small objects such as cups or other small containers because of the high insulating properties of the thermoplastic material and the low heat transfer coefficient of the hot gas.

It is usually preferable to pre-expand thermoplastic expandable particles by steam, rather than hot air because steam is more efficient and conservant of energy in that it provides much greater heat transfer than hot air because steam gives up both sensible heat and latent heat of condensation. However, when steam is used in the pre-expansion the pre-expanded particles cannot normally be directly injected into the mold because they are wet and do not readily flow. The aging period, mentioned above, also serves to dry the surfaces of the beads so that when they are injected into a mold they will be free-flowing. In another patent, U.S. Pat. No. 3,129,464, issued to Heider on Apr. 21, 1964, thermoplastic expandable particles are pre-expanded by steam and are then transferred almost immediately to a mold station. It appears that although the pre-expanded particles or beads may be wet from the steam this problem is overcome by the use of plungers which force the beads first into a transfer vessel and then into the mold which is shaped to be force filled in this way. However, many molds are not shaped to be force filled and therefore dry easily flowable beads are preferred for most custom molding operations to provide easy and complete filling of variously shaped molds. Further, Heider requires further heat as well as pressure by a force plug to form the article into its desired shape which is not applicable to many expandable molding operations.

A process has now been discovered by which certain advantages have been gained over those presently known processes for molding thermoplastic expandable particles including those referred to above. More specifically the process which begins with pre-expanding of the thermoplastic particles with steam avoids the necessity of aging the particles or beads to permit pressure equilibration and at the same time provides a dry easily flowable expanded bead which can be molded in any shaped mold with greatly reduced cycle times. Shortening of the cycle time is accomplished in the portions of the cycle both before the beads are inserted into the mold and during the cooling portion thereof while the molded object is cooling in the mold. Further the present inventive process results in conservation of energy and time presently necessary in the heating phases of the molding cycle.

Accordingly, it is an object of this invention to present an improved process for molding expanded thermoplastic articles.

It is another object of this invention to present a method of reducing the molding cycle time in the manufacture of molded, expanded thermoplastic articles.

It is a further object of this invention to present a process for molding expanded thermoplastic articles from freshly pre-expanded beads, said beads having been pre-expanded by steam.

It is a still further object of this invention to present an improved process for molding expanded thermoplastic articles which result in conservation of energy and thus reduces cost.

These and other objects of the invention will become more readily apparent as the description proceeds.

SUMMARY OF THE INVENTION

The process of the invention preferably comprises pre-expanding by directly contacting with live steam expandable thermoplastic resin beads containing a liquid hydrocarbon expanding agent to form pre-expanded beads, maintaining the temperature of the pre-expanded beads above the boiling point of the expanding agent but below the fusion temperature of the thermoplastic material by means of a hot relatively dry gas until substantially all of the surface moisture is removed while continuously agitating the beads, introducing the dry pre-expanded beads into a closed mold and heating them therein to a temperature above the fusion temperature of the thermoplastic material thereby further expanding and fusing the expanded beads into an article having the configuration of the mold and cooling the resulting shaped article. A critical feature of the invention is that the temperature of the thermoplastic pre-expanded beads is not permitted to drop below the boiling point of the expanding agent at any time after the beads are pre-expanded and before the molded article is cooled at the end of the molding cycle. In a preferred embodiment the thermoplastic material is expandable polystyrene. Also in the preferred embodiment the pre-expanded particles which are raised to a high temperature by the steam applied to them during pre-expansion are never allowed to cool down to less than about 1° – 20° C. below their fusion temperature. Thus only a small temperature rise is necessary for them to be brought to their fusion temperature in the mold which may be accomplished for example by injecting a small amount of steam directly into the material in the mold. Thus there is a considerable saving of energy and time as compared to a process as described in the Knapp patent, previously referred to, wherein the pre-expanded beads are not disclosed to be taken out of the pre-expander in a heated condition and maintained at an elevated temperature but must be heated up from evidently a cooled down state reached during aging. Thus while the Knapp patent discloses that the beads should be pre-heated before insertion of the beads into the mold he did not foresee the advantage of maintaining the beads in the heated condition they have reached in the pre-expander by maintaining them in their heated condition by the use of hot gas which will dry them quickly while avoiding the time consuming pressure equalizing aging process.

According to a modification of the invention the expandable thermoplastic beads may be maintained under greater than atmospheric pressure prior to the period of pre-expansion thereof or during the period when they are maintained in their heated condition by means of hot relatively dry gas or during both periods. This pressurization results in certain advantages which will be further elaborated on as the description proceeds.

BRIEF DESCRIPTION OF THE DRAWING

The process is illustrated in the attached sheet of the drawing.

DESCRIPTION OF THE INVENTION

The term bead is used to describe thermoplastic resin material in a finely divided state which may also be referred to as particles, pellets and fragments which are all obtained by the comminution of thermoplastic resinous material in bulk form.

The polymers which may be processed in accordance with the present invention are any of the expandable thermoplastic resins known in the prior art. Examples of suitable expandable thermoplastics are the homopolymers of vinyl aromatic monomers such as styrene and alphamethylstyrene and copolymers of these with other vinyl monomeric compounds, and homopolymers and copolymers of other synthetic resins such as polyacrylic esters, polyvinyl chloride and polyolefins, such as polyethylene and polypropylene.

The expanding agent used in the manufacture of the expandable thermoplastic resin may be any liquid hydrocarbon or substituted hydrocarbon which is a non-solvent or poor solvent for the polymer being treated and which is a liquid at normal atmospheric temperature and pressure. Suitable expanding agents are those having boiling points of from about 15° to approximately 100° C. and petroleum ethers having a boiling range of about 20° to 70° C. are particularly preferred. Such compounds generally contain about 70% n-pentane. Examples of other typical hydrocarbons which are suitable for use in the invention are the alkanes such as pentane and hexane. Mixtures of two or more expanding agents can also be used in the invention provided that the major portion of the expanding agent mixture is liquid at normal room temperature. Any effective amount of expanding agent may be used. An amount in the range of about 1 – 15% by weight of the thermoplastic particles is commonly used. According to a preferred embodiment about 3 – 10% by weight of expanding agent is used.

The particle size of the expandable beads is not critical, although it is preferable that it be in the range of about 0.05 to 10.0 mm. in diameter. Larger size particles may be used but they are generally not as satisfactory for economic and quality control reasons. Very fine particles can also be used in the invention although these are likewise less desirable than those in the preferred range because of the difficulty of handling them.

The method of preparing a thermoplastic material having incorporated therein the expanding agent is not critical and forms no part of the present invention. These compounds are generally prepared by either adding an expanding agent to a polymerizing reaction mixture during the polymerization or by post-impregnation of the expanding agent into the polymer.

In the process of the invention expandable thermoplastic resin beads are first pre-expanded, typically in an apparatus known as a pre-expander in which the particles are exposed and contacted by live steam which raises their temperature to the point where they begin to soften and normally causes some wetting of the beads. An expanding agent previously incorporated in the particle and selected to have a boiling point below the softening temperature of the bead will have begun to vaporize and the gaseous pressure built up within the particles causes the beads to expand to a size of about 20 – 40 times their original size forming pre-expanded thermoplastic beads. The beads may be expanded to a density over a wide range depending upon their final useage i.e. from about 0.05 to 40 lbs. per cubic foot. The pre-expanded beads are then preferably removed from the pre-expander and, without permitting the temperature of the beads to drop below the condensation temperature of the now gaseous expanding agent are then passed into a heater in which they are heated by means of substantially dry gas, preferably air, for a time sufficient to remove substantially all of the surface moisture on the beads resulting from their exposure to the steam in the pre-expander. It is preferable to remove the beads from the pre-expander to the heater for the drying operation, however, it may be possible to utilize equipment wherein the beads are first exposed to live steam and then subsequently without transfer are then exposed to the temperature maintaining drying air. Since the temperature obtained in the heater may reach the softening point of the pre-expanded thermoplastic beads they accordingly should be continuously agitated to prevent agglomeration. The temperature of the beads in the heater is preferably maintained above the softening temperature but below the fusion point of the thermoplastic material. The agitation may be accomplished, for example, by providing stationary and movable rods within the heater causing a mixing action in the beads or by any other known means.

While it is within the realm of the present invention to have the pre-expanded beads cool down somewhat, perhaps unavoidably in certain equipment, so long as they remain above the temperature of the boiling point of the included expanding agent it is preferable to maintain a temperature as high as possible below the fusion temperature of the thermoplastic materials without sticking together of the particles. To gain the benefit of the invention in the conservation of time and energy it is preferable that the bead temperature should not fall below the range of about 1° – 40° C. below the fusion temperature of the thermoplastic expandable beads. It is most preferable that the temperature shall not fall below about 1° – 20° C. below the fusion temperature of the thermoplastic beads.

When the desired degree of heating and moisture removal is obtained the pre-expanded beads are charged into a closed mold which is in the shape of the finished product and which will fill easily and completely due to the dry flowable condition of the beads. The beads are then heated sufficiently to raise their temperature above the fusion temperature of the thermoplastic bead material whereupon the beads further expand to fill the mold and fuse together to form an article having a smooth continuous skin. Because of the high temperature of the beads in the preferred form of the invention when they enter the mold only a small temperature rise is necessary to raise their temperature above the fusion temperature and this may be most economically and quickly performed by injecting steam directly into the beads by various vents provided in the mold. Some heating of the mold forming surfaces is also usually desirable to provide an unimpaired well fused smooth continuous skin on the finished article. A simple heat exchange jacket around the mold can accomplish this and thus it can be seen that much less expensive molds than that previously required for this type of molding may be utilized. In particular, the large metal molds employing expensive steam chests for heating purposes may be replaced by molds which do not require such expensive and energy wasting heating apparatus and it may even be possible to replace the metal molds in some particular operation with molds of other less expensive materials such as synthetics or mixtures thereof.

The heating period of the pre-expanded beads in the mold is thus shortened greatly lasting as little as 5 – 10 seconds. This is a very great improvement over the prior art processes in which the beads are heated from room temperature to their fusion temperature in the mold, which typically requires a period of about 20 – 30 seconds. Of course a longer time and great deal of energy is used to initially heat up the conventional steam chest-type mold which may be largely avoided as described above. After the molded article is formed the temperature of the article should be quickly reduced to below the softening temperature of the thermoplastic material and the article is then ready for removal from the mold. Since the mold is not heated to excessive temperatures during the heating up stage the cooling requirement is much less than is ordinarily required in prior art processes and consequently the cooling cycle is quite short. For most operations the article may be cooled quickly and sufficiently by spraying cooling water on the mold or passing cooling water through the mold for several seconds.

During the heating of the thermoplastic beads in hot air immediately before the insertion thereof into the mold, and especially when temperatures are reached above the softening point of the thermoplastic material, the expanding agent which is present in a vapor form within the beads may escape from the beads. Thus after a period of time a certain amount of the expanding agent left in the bead after it leaves the pre-expander may be driven out of the beads. Thus, if the beads having a content of expanding agent higher than desirable are heated at these elevated temperatures for a sufficient time it appears possible to lower the content of expanding agent within the beads to a more desirable level (for example, to lower the content by a substantial percentage, such as 25% of the content of expanding agent which was in the beads as the beads left the pre-expander). By adjusting temperature and time of the hot air heating stage and determining beforehand the expanding agent content of the pre-expanded beads it should be possible to regulate the expanding agent content of the beads to the amount desired as they enter the mold. Having less expanding agent in the beads as they enter the mold is advantageous in shortening the cooling cycle since there will be less heat absorbed by the molded article by the excess expanding agent during the expansion that takes place in the mold.

A modification of the process has been referred to wherein the expandable thermoplastic particles may be maintained under greater than atmospheric pressure during the period of pre-expansion thereof or during the period when they are maintained in their heated condition by means of hot relatively dry gas or during both periods. The effect of pressurizing the material in the pre-expander is to raise the boiling point of the expanding agent therein and to control the volume of vapor which it is transformed into at the elevated temperatures. Thus the particles may be heated to a fairly high temperature without pre-expanding due to the increased pressure therein and then if the pressure is released the expandable thermoplastic particles will instantly expand an amount in accordance with the volume of the pre-expander and the amount of expanding agent incorporated in the particles. The use of greater than atmospheric pressure in the pre-expander then allows for certain control of the timing of the pre-expansion of the thermoplastic particles to form pre-expanded thermoplastic beads. The beads could then be transferred to a heater which is not pressurized and the process would go on as described previously.

However, the pre-expanded beads may be transferred to a heater also maintained at greater than atmospheric pressure. In this case, again the boiling temperature of the expanding agent will again be higher in this environment and also the pressure within the beads due to the vaporized expanding agent present at elevated temperatures will be counteracted by the increased pressure within the heater. Thus the temperature of the pre-expanded material may be raised to higher levels than possible before in an unpressurized heater without causing undesirable further expansion. This very hot material may then be fed utilizing known equipment into a mold which may be at atmospheric pressure, for example, and the material will expand and fuse almost immediately due to its heated condition which may be above the fusion temperature. The mold may also be initially pressurized above atmospheric pressure to allow it to be filled without expansion taking place prematurely to possibly prevent complete filling and then the pressure quickly released causing fusion of the beads. Finally the mold conceivably could be maintained at a lower than atmospheric pressure and the material caused to be shot into the mold utilizing known equipment to fill it almost instantly. No actually heating of the material in the mold may be required to fuse the material and thus cooling upon expansion of the beads would be most rapid.

Thus attention is directed to Example 1 which illustrates a preferred embodiment of the invention.

EXAMPLE 1

Expandable polystyrene beads, having a softening temperature of about 76° C. and a fusion temperature of about 95° C., containing 5% pentane, are placed in a pre-expander and heated, while being continuously agitated, for 1½ minutes. The beads pre-expand to an average density of 1.5 lbs. per cubic foot. At this point the temperature of the beads is about 82° C. The pre-expanded beads are transferred to a hot air heater which has been pre-heated to a temperature of about 80° C. Care is taken to ensure that the temperature of the beads does not drop below 70° during the transfer. The beads are heated in the hot air heater for 5 minutes with continuous agitation to prevent agglomeration of the beads. At this point substantially all of the surface moisture has been removed and the beads flow easily. 0.5 lbs. of the pre-expanded beads are injected into a closed mold equipped with a heat exchange jacket and ports for injecting live steam directly into the mold cavity and live steam is injected into the mold for 3 seconds. The article is then cooled by passing cooling water through the mold for 3 seconds, after which the mold is opened and the molded article is removed. The article has a uniform density and smooth continuous surface.

It should be understood that while the invention has been described in several forms, certain changes in details of the process, especially by those skilled in the art, not inconsistent with the disclosure are contemplated. The scope of the invention is limited only by the breadth given to the appended claims.

I claim:

1. A method of preparing expanded, shaped thermoplastic articles comprising:
    a. pre-expanding, by means of live steam, a synthetic thermoplastic resin in bead form containing an expanding agent having a boiling point of above 15° – 100° C. to a density of about 0.05 to 40 lbs. per cubic foot, the steam contacting the particles and resulting normally in some wetting of the resulting pre-expanded beads;
    b. heating the pre-expanded beads, by means of hot substantially dry gas to a temperature above both the boiling point of the expanding agent and above the softening temperature of the thermoplastic resin beads but below the fusion temperature of the thermoplastic resin beads for a period of time sufficient to remove substantially all the moisture from the surfaces of the beads, the beads being substantially continuously agitated during any period of time during the hot gas heating period when the beads are heated to a temperature above their softening temperature;
    c. transferring the heated pre-expanded beads into a closed mold;
    d. forming a shaped article from the beads by heating them to at least their fusion temperature causing said beads to expand and fuse together; and
    e. cooling the shaped articles to a temperature below the softening temperature of the thermoplastic material and removing the article from the mold;
the temperature of the beads being continuously maintained above the boiling point of the expanding agent from the time the beads are pre-expanded to the time they are expanded to form the shaped article.

2. A process according to claim 1 wherein the pre-expanded beads are heated during their pre-expansion and maintained in a temperature range which is no more than about 1° – 20° C. below the fusion temperature of said thermoplastic resin.

3. A process according to claim 1 wherein the pre-expanded beads are heated during their pre-expansion and maintained in a temperature range which is no more than about 1° – 40° C. below the fusion temperature of said thermoplastic resin.

4. A process according to claim 1 wherein the expanding agent is a hydrocarbon having a boiling point of about 20° – 70° C.

5. A process according to claim 4 wherein the expanding agent is selected from the group consisting of pentane, hexane and petroleum ethers having a boiling point of 20° – 70° C.

6. A process according to claim 5 wherein the expanding agent is pentane.

7. A process according to claim 1 wherein the thermoplastic material is polystyrene.

8. The process of claim 1 wherein the gas used to heat the beads is hot air.

9. The process according to claim 1 wherein the thermoplastic resin beads are maintained under a pressure greater than atmospheric from at least the time they are pre-expanded to the time they enter the mold.

10. The process according to claim 1 wherein the pre-expanded beads are heated at a temperature above the boiling point of the included expanding agent for a period of time sufficient to drive off at least about 25% of the expanding agent originally present in the pre-expanded beads.

11. The process according to claim 1 wherein the pre-expansion of the thermoplastic resin beads takes place under greater than atmospheric pressure.

* * * * *